United States Patent [19]

Gramm

[11] Patent Number: 5,217,045

[45] Date of Patent: Jun. 8, 1993

[54] DISTRIBUTOR DEVICE

[76] Inventor: Gerhard Gramm, Waldstrasse 15, D-7533 Tiefenbronn-Mühlhausen, Fed. Rep. of Germany

[21] Appl. No.: 836,335

[22] PCT Filed: Jun. 29, 1990

[86] PCT No.: PCT/EP90/01047

§ 371 Date: Mar. 2, 1992

§ 102(e) Date: Mar. 2, 1992

[87] PCT Pub. No.: WO91/00462

PCT Pub. Date: Jan. 10, 1991

[30] Foreign Application Priority Data

Jul. 3, 1989 [DE] Fed. Rep. of Germany ....... 3921829

[51] Int. Cl.⁵ .................... F16K 11/16; F16K 11/074
[52] U.S. Cl. ................................. 137/595; 137/625.46
[58] Field of Search ................ 137/595, 597, 625.46, 137/865

[56] References Cited

U.S. PATENT DOCUMENTS

| | | | |
|---|---|---|---|
| 1,566,605 | 12/1925 | Jamison | 137/597 X |
| 2,031,614 | 2/1936 | McKee et al. | 137/597 X |
| 2,105,198 | 1/1938 | McNamara | 137/595 X |
| 2,500,239 | 3/1950 | Beyette | 137/597 |
| 2,837,115 | 6/1958 | Bancroft | |
| 2,908,293 | 10/1959 | Johnson | 137/597 X |
| 3,499,465 | 3/1970 | Roop | 137/865 X |
| 3,545,474 | 12/1970 | Brown | 137/865 X |

FOREIGN PATENT DOCUMENTS

| | | |
|---|---|---|
| 3509764 | 10/1986 | Fed. Rep. of Germany . |
| 3545681 | 12/1988 | Fed. Rep. of Germany . |
| 1394464 | 2/1965 | France . |
| 1544824 | 9/1968 | France . |
| 536370 | 5/1941 | United Kingdom .............. 137/595 |

*Primary Examiner*—Stephen M. Hepperle
*Attorney, Agent, or Firm*—Speckman, Pauley & Fejer

[57] ABSTRACT

A distributor device for selective connection of at least one first inlet line with a first outlet line, as well as connection of a second inlet line with at least one second outlet line. The distributor device also comprises at least two spatially separated control elements. The first inlet line is connected to a first stationary body, each second outlet line is connected to a second stationary body, the first outlet line is connected to a first rotatable body, and the second inlet line is connected to a second rotatable body. The first and second rotatable bodies are rotatable with respect to the first and second stationary bodies. The first rotatable body and the second rotatable body each have a plurality of working positions wherein the first inlet lines communicate with the first outlet line and the second inlet line communicates with the second outlet lines.

18 Claims, 3 Drawing Sheets

DISTRIBUTOR DEVICE

BACKGROUND OF THE INVENTION

1. Field of the Invention

This invention relates to a distributor device for the selective connection of one or a plurality of incoming lines with an outgoing line as well as an outgoing line with one or a plurality of outgoing lines.

2. Description of Prior Art

Distributor devices of the above mentioned type are known and described, for example, in German Letters Patent DE-PS 35 45 681. In this case, the distributor device has a plurality of incoming lines as well as a corresponding number of outgoing lines, so that a relative rotation of the bodies with respect to each other by 360° or more is only possible if the lines consist of elastically deformable materials and are sufficiently long. A further disadvantage of the known device is that the number of different medium-conducting lines is relatively small.

Furthermore, a device for the selective connection of lines for flowable media is described in German Patent Publication DE 35 09 764 A1 and is embodied as a linear slider, the parts of which perform linear back-and-forth movements, even when two linear sliders placed in a common housing are cooperating.

SUMMARY OF THE INVENTION

Based on the above state of the art, it is one object of this invention to provides distributor device in accordance with the species, without a need for unreasonable constructive efforts, in such a way that a plurality of connections between medium sources and users is accomplished in the smallest possible space.

The above object is achieved in accordance with one preferred embodiment invention by at least two spatially separated control elements which are connectable to the lines. Each control element is connected to a stationary body and is connectable with the incoming or outgoing lines as well as to a body which is rotatable with respect to it. Each control element can assume several working positions and is connectable to the outgoing or incoming lines, the line of which conducts a medium if it is in a working position with respect to any one of the lines of the stationary body.

It is noted that in every case that is invention has been reduced practice the bodies which can be connected to a plurality of lines, these being the bodies which can be connected with medium sources, are stationary, while the lines which can be connected to the users can be removably connected with the rotatable bodies.

Further practical and advantageous embodiments of the invention ensue from the dependent claims.

In a particularly practical embodiment of this invention the rotatable bodies are driven by at least one servomotor. If this relates to a distributor device, the rotatable body of which is formed of circular disks, it is advantageous if the radial exteriors of the bodies are formed as toothed wheels which cooperate with a toothed wheel of the servomotor. With this simplest embodiment of the invention, there is also the opportunity of the motor meshing with the toothed gear of the one rotatable body, while this body meshes with the other rotatable body. In either case it is possible for the rotatable bodies to rotate in opposite directions.

The distributor device may also comprise a plurality of control elements, for example three, four, etc. In this preferred embodiment the rotatable bodies can be connected with each other with toothed gears which can be adjusted between an active working position, cooperating with the rotatable bodies, and an inactive working position, where they do no cooperate with the rotatable bodies.

If it is intended to use the distributor device of this invention in an installation with a plurality of medium sources and users, it is practical if the servomotor as well as all toothed gears cooperating with a adjustment device can be connected to a central control device The control device can be a computer installation in which the type of connection and duration can be controlled.

In a particularly practical embodiment of this invention, the stationary body has a plurality of circular holes with outwardly extending connecting sleeves, to which the lines can be connected and which have the same distance from the axis of rotation of the rotatable body. The respective body has a single circular hole with a sleeve adjoining it which, in the working position of the rotatable body, is aligned with one of the holes of the stationary body. In this particular embodiment these steps can also be taken in such a way that the hole of the stationary body and/or the holes of the rotatable body are surrounded by sealing elements.

BRIEF DESCRIPTION OF THE DRAWINGS

An exemplary embodiment of this invention is schematically illustrated in the drawings and will be explained in detail, wherein.

DESCRIPTION OF PREFERRED EMBODIMENTS

Figure 1:
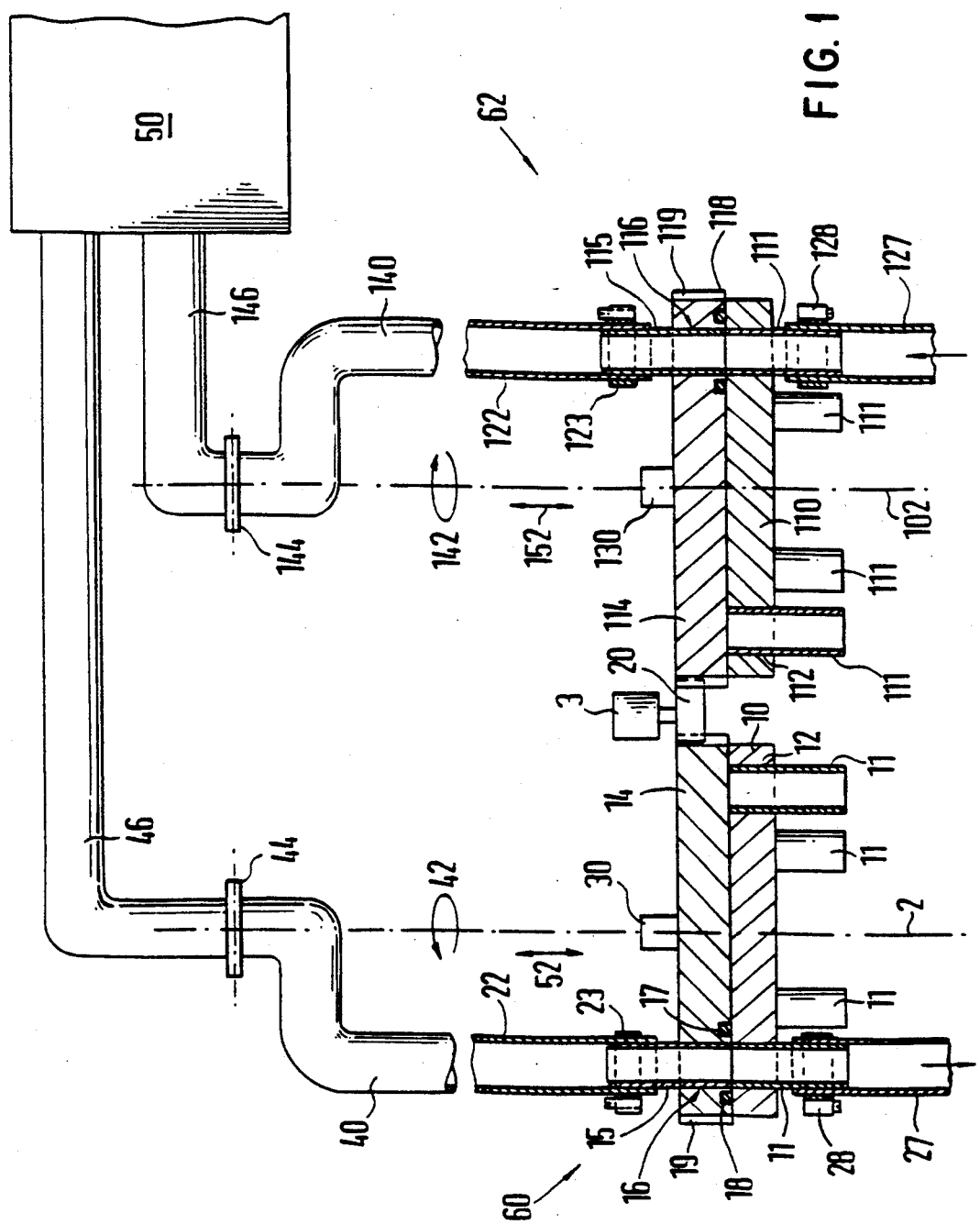
FIG. 1 is an axial cross sectional view of a distributor device connected to a user.

The distributor device shown in FIG. 1 comprises two mirror-symmetrical control elements 60 and 62, each of which comprises a stationary body 10 and 110 and a rotatable body 14 and 114.

Figure 2:
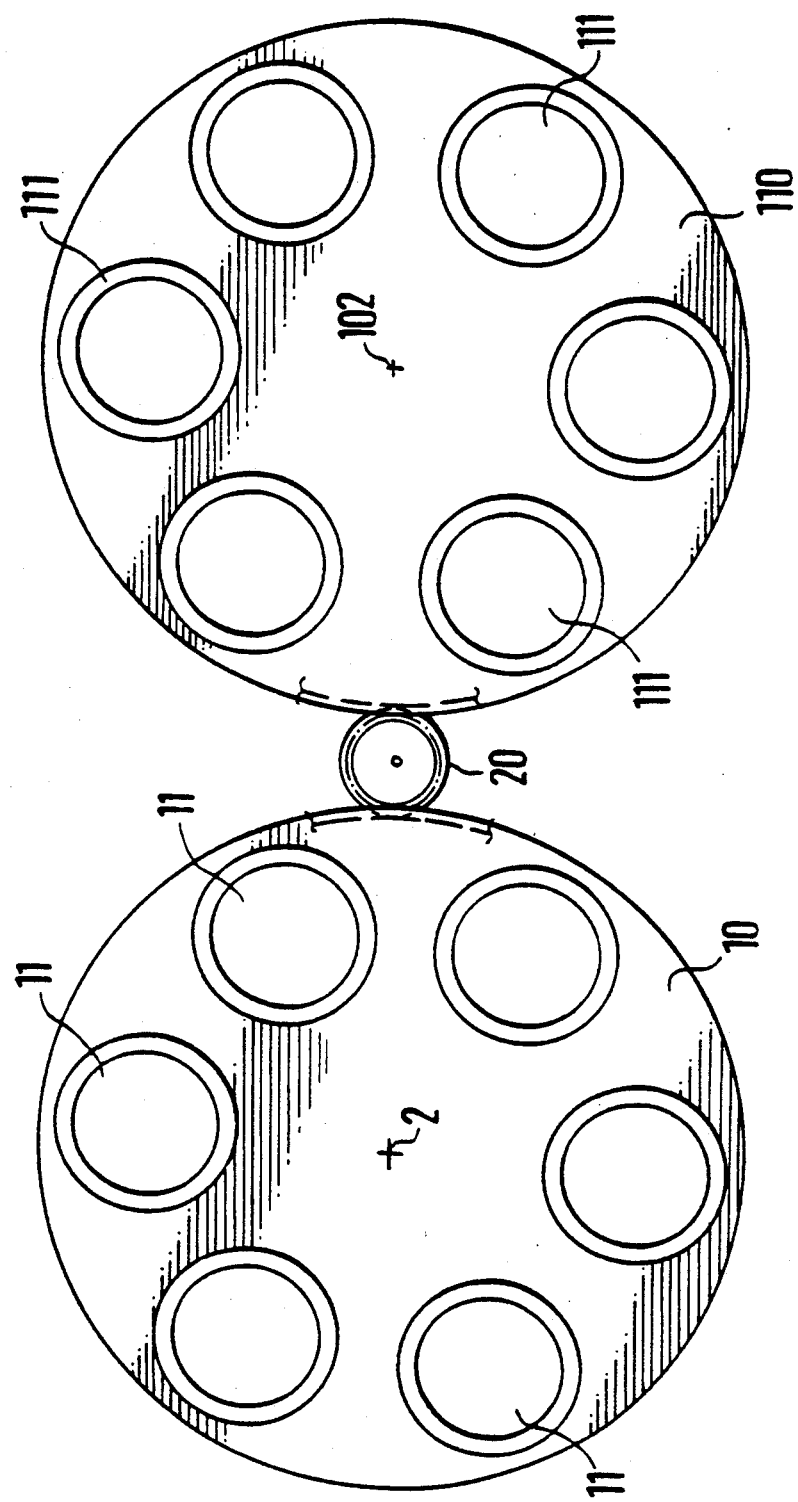
FIG. 2 is a top view of the distributor device, in a direction of the arrow II of FIG. 1.

The control element 62 shown in FIG. 1 is connected to a medium source, not shown in detail, and to a user 50. The medium is supplied to the control element 62 via the line 127, which is connected to a sleeve 111 by means of a clamp 128. The stationary body 110 has a plurality of connecting sleeves 111, as shown in FIG. 2. The rotatable body 114 has a single hole 116 into which a sleeve 115 is inserted, which is connected with the line 122 by means of a clamp 123.

A line 140 follows the line 122 and is connected via a rotating flange 144 in a medium-conducting manner with the line 146. The rotatable body 114 can be rotated around a vertical axis 102 in the direction of the arrow 142. The rotatable body 114 is seated in a bearing body 130. The rotatable body 114 has on its radial exterior a toothed gear 119 which meshes with the toothed gear 20 of a motor 3. If the rotatable body 114 is rotated about its axis 102, the connecting line 140 also rotates in the rotating flange 144, by means of which a rotatable connection between the line 140 and the lines 146 is accomplished.

As already mentioned, the left control element 60 shown in FIG. 1 is mirror-symmetrical to the control element 62, so that it has a plurality of connecting sleeves 11 which can be connected with outlet lines 27 by means of clamps 28. The radial exterior of the rotatable body 14 has an outer toothed gear 19. The rotatable body 14 has a single bore 16, in which a sleeve 15 is positioned and surrounded by a seal ring 18. The seal ring 118 has the same function as the seal ring 118. The sleeve 15 is removably connected with the incoming line 22 by means of a clamp 23. The incoming line 22 is connected with the line 44 which, in turn, can be rotatably connected with the line 46 via the rotating flange 44. The rotatable body 14 or 114 can cooperate with a servomotor which can displace it in a timed manner in the direction of the arrow 52 or 152. When the motor 3 is switched on, the left rotatable body shown in FIG. 1 rotates in the direction of the arrow 42, while the right rotatable body 114 rotates in the direction of the arrow 142. In both cases, it is important that the rotating flange 44 or 144 has an axis of rotation which is identical with the axis of rotation 2 or 102 or extends parallel with it. Thus the line 40 or 140 is not mechanically stressed This probably simplest embodiment of this invention can be expanded in such a way that for example a plurality of control elements 60 and 62 are connected with each other. In such embodiment the control elements can be driven by a common motor 3, where the rotational movement from one rotatable body to the next can take place via toothed gears, which can take up active or inactive working positions. It thus possible to separate a defined control element from the motor 3. A plurality of medium-conducting connections can thus be provided without the necessity of making the distributor device perceptively larger.

FIG. 2 shows one preferred embodiment in which the connecting sleeves 11 or 111 are evenly distributed around the axis of rotation 2 or 102.

Figure 3:
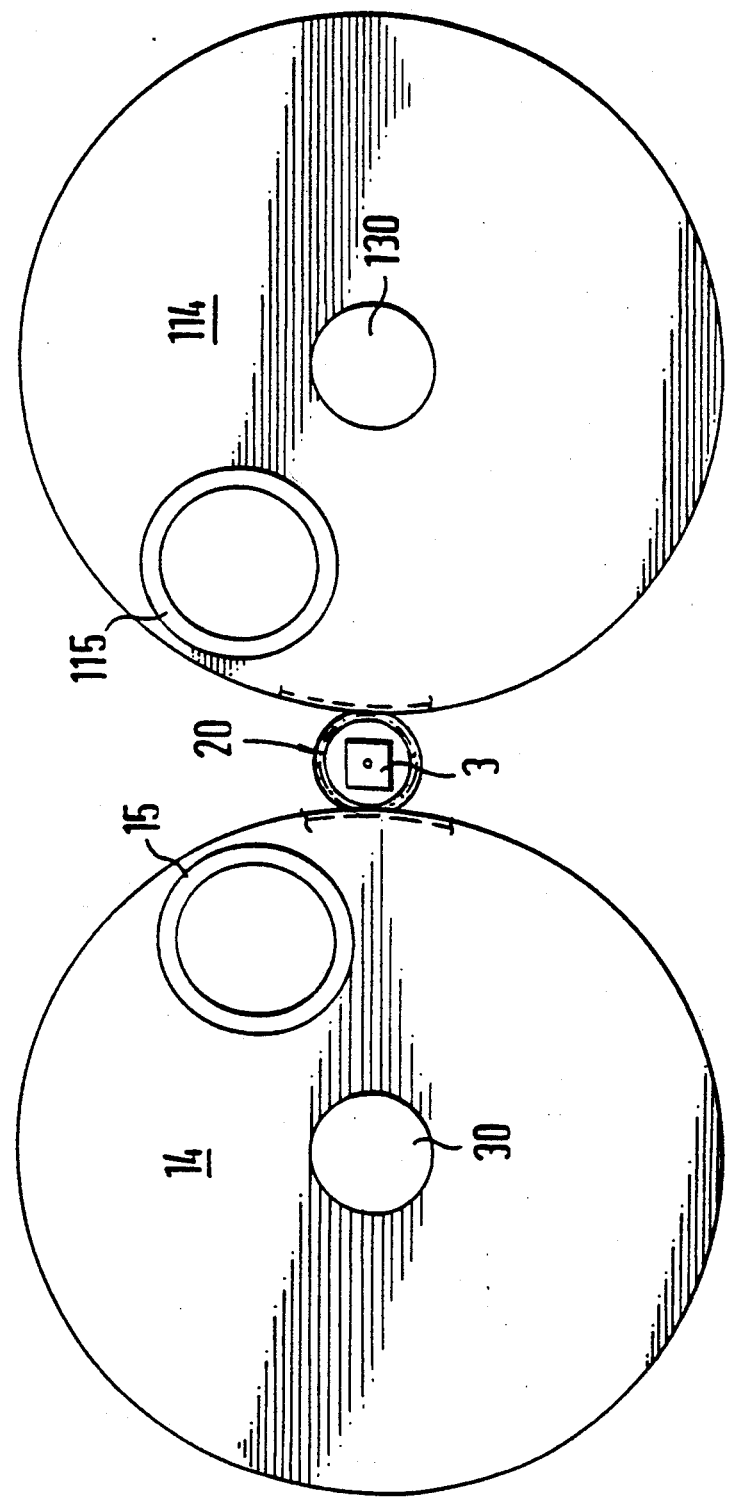
FIG. 3 is a top view of the distributor device in the direction of the arrow III of FIG. 1.

FIG. 3 shows one preferred embodiment in which the rotatable body 14 or 114 has only a single sleeve 15 or 115, which is adapted to the dimensions of the sleeve 11 or 111.

I claim:

1. A distributor device for selective connection of at least one first inlet line with a first outlet line as well as a second inlet line with at least one second outlet line, the distributor device comprising:
    at least two spatially separated control elements connectable to each said first inlet line (127), said first outlet line (122), said second inlet line (22) and each said second outlet line (27), each said first inlet line (127) connected to a first stationary body (110), each said second outlet line (27) connected to a second stationary body (10), said first outlet line (122) connected to a first rotatable body (114), said second inlet line (22) connected to a second rotatable body (14), said first rotatable body (114) rotatable with respect to said first stationary body (110), said second rotatable body (14) rotatable with respect to said second stationary body (10), each of said first rotatable body (114) and said second rotatable body (14) having a plurality of working positions in which one of said first inlet lines (127) communicates with said first outlet line (122) and said second inlet line (22) communicates with one of said second outlet lines (27) and said first and second rotatable bodies (14, 114) being formed by circular disks and a radial exterior of said first and second rotatable bodies (14, 114) being constructed as first toothed gears (19, 119) which each cooperate with a second toothed gear (20) of a motor (3).

2. A distributor device in accordance with claim 1, wherein said first and second rotatable bodies (14, 114) are driven by at least one servomotor (3).

3. A distributor device in accordance with claim 2, wherein said first and second rotatable bodies (14, 114) are driven by a common said motor (3).

4. A distributor device in accordance with claim 1 with at least three said control elements,
    wherein said first and second rotatable bodies (14, 114) are connected with each other via said first toothed gears (19, 119) and said second toothed gear (20) which can be adjusted between an active working position where they cooperate with said first and second rotatable bodies (14, 114) and an inactive working position where they do not cooperate with said first and second rotatable bodies (14, 114).

5. A distributor device in accordance with claim 4, wherein said motor (3) and said first toothed gears (19, 119) cooperating with an adjusting device are connectible to a central control device.

6. A distributor device in accordance with claim 5, wherein said first and second stationary bodies (10, 110) each has a plurality of circular holes with outwardly extending connecting sleeves to which each said first inlet line (127) and each said second outlet line (27) respectively are connectible and which have a same distance dimension from an axis of rotation (2, 102) of each said respective first and second rotatable body (14, 114), and
    each said respective first and second rotatable body (14, 114) has a circular hole with a sleeve (15, 115) adjoining it, which in one of said working positions of said first and second rotatable bodies (14, 114) is aligned with one of said holes of said first and second respective stationary bodies (10, 110).

7. A distributor device in accordance with claim 6, wherein at least one of said holes of said first and second stationary bodies (10, 110) and said hole of each said rotatable body (14, 114) is surrounded by a plurality of sealing elements.

8. A distributor device in accordance with claim 7, wherein a vacuum pump is placed into an outgoing line from a user (50).

9. A distributor device in accordance with claim 8, wherein said axes of rotation (2, 102) of said first and second rotatable bodies (14, 114) extending parallel to each other.

10. A distributor device in accordance with claim 9, wherein said first and second rotatable bodies (14, 114) are adjustable in a direction of their axes.

11. A distributor device in accordance with claim 1, wherein said first and second rotatable bodies (14, 114) are drives by a common said motor (3).

12. A distributor device in accordance with claim 1 with at least three said control elements, wherein said first and second rotatable bodies (14, 114) are connected with each other via said first toothed gears (19, 119) and said second tooted gear (20) which can be adjusted between an active working position where they cooperate with said first and second rotatable bodies (14, 114) and an inactive working position where they do not cooperate with said first and second rotatable bodies (14, 114).

13. A distributor device in accordance with claim 1, wherein a servomotor (3) and said first toothed gears (19, 119) cooperating with an adjusting device are connectible to a central control device.

14. A distributor device in accordance with claim 1, wherein said first and second stationary bodies (10, 110) each has a plurality of circular holes with outwardly extending connecting sleeves to which each said first inlet line (127) and each said second outlet line (27) respectively are connectible and which have a same distance dimension from an axis of rotation (2, 102) of each said respective first and second rotatable body (14, 114), and each said respective first and second rotatable body (14, 114) has a circular hole with a sleeve (15, 115) adjoining it, which in one of said working positions of said first and second rotatable bodies (14, 114) is aligned with one of said holes of said first and second respective stationary body (10, 110).

15. A distributor device in accordance with claim 14, wherein at least one of said holes of said first and second stationary bodies (10, 110) and said hole of each said rotatable body (14, 114) is surrounded by a plurality of sealing elements.

16. A distributor device in accordance with claim 1, wherein a vacuum pump is placed into an outgoing line from a user (50).

17. A distributor device in accordance with claim 1, wherein axes of rotation (2, 102) of said first and second rotatable bodies (14, 114) extend parallel to each other.

18. A distributor device in accordance with claim 1, wherein said first and second rotatable bodies (14, 114) are adjustable in a direction of their axes.

* * * * *